United States Patent
Song et al.

(10) Patent No.: US 12,166,194 B2
(45) Date of Patent: Dec. 10, 2024

(54) METHOD OF RECOVERING CAPACITY OF A USED BATTERY AND A SECONDARY BATTERY CAPACITY RECOVERY APPARATUS

(71) Applicant: LG CHEM, LTD., Seoul (KR)

(72) Inventors: Jun Hyuk Song, Daejeon (KR); Je Young Kim, Daejeon (KR); Joo Sung Lee, Daejeon (KR); Suk In Noh, Daejeon (KR); Hee Won Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 366 days.

(21) Appl. No.: 16/958,953

(22) PCT Filed: Feb. 18, 2019

(86) PCT No.: PCT/KR2019/001924
§ 371 (c)(1),
(2) Date: Jun. 29, 2020

(87) PCT Pub. No.: WO2019/164202
PCT Pub. Date: Aug. 29, 2019

(65) Prior Publication Data
US 2020/0381702 A1    Dec. 3, 2020

(30) Foreign Application Priority Data

Feb. 23, 2018  (KR) .................. 10-2018-0021893

(51) Int. Cl.
*H01M 10/04*  (2006.01)
*H01M 4/04*  (2006.01)
*H01M 10/0525*  (2010.01)
*H01M 10/44*  (2006.01)

(52) U.S. Cl.
CPC ....... *H01M 4/0447* (2013.01); *H01M 4/0471* (2013.01); *H01M 10/0481* (2013.01); *H01M 10/0525* (2013.01); *H01M 10/44* (2013.01)

(58) Field of Classification Search
CPC .. H01M 4/0447; H01M 4/0445; H01M 4/044; H01M 4/0471; H01M 10/0481; H01M 10/0525; H01M 10/052; H01M 10/44; H01M 10/448; H01M 10/441
See application file for complete search history.

(56) References Cited

U.S. PATENT DOCUMENTS

| | | | |
|---|---|---|---|
| 2013/0115486 A1 | 5/2013 | Saito et al. | |
| 2013/0115512 A1* | 5/2013 | Jiang ................. | H01M 10/058 216/13 |
| 2014/0028264 A1 | 1/2014 | Taniyama et al. | |
| 2017/0074634 A1 | 3/2017 | Yoon et al. | |

FOREIGN PATENT DOCUMENTS

| | | | |
|---|---|---|---|
| CN | 101944592 | * 11/2012 | ............ H01M 4/133 |
| CN | 103931041 A | 7/2014 | |
| CN | 105633493 A | 6/2016 | |
| EP | 2688134 A1 | 1/2014 | |
| JP | 2012-195161 A | 10/2012 | |
| JP | 2013-037863 A | 2/2013 | |
| JP | 2013-045507 A | 3/2013 | |
| JP | 2015-187938 A | 10/2015 | |
| JP | 2017-045621 A | 3/2017 | |
| JP | 2017-117637 A | 6/2017 | |
| KR | 10-2013-0042551 A | 4/2013 | |
| KR | 10-2016-0063278 A | 6/2016 | |
| KR | 10-2018-0000605 A | 1/2018 | |

OTHER PUBLICATIONS

Abstract of CN 101944592, Geng Shida, High-capacity Silicon-copper/carbon Composite Cathode Material Of Lithium Ion Battery And Production Process Thereof, Nov. 28, 2012.*
Extended European Search Report dated Jan. 25, 2021 issued by the European Patent Office in a corresponding European patent application No. 19757407.2.
International Search Report (with partial translation) and Written Opinion issued in corresponding International Patent Application No. PCT/KR2019/001924, dated May 24, 2019.

\* cited by examiner

*Primary Examiner* — Raymond Alejandro
(74) *Attorney, Agent, or Firm* — MORGAN, LEWIS & BOCKIUS LLP

(57) ABSTRACT

A method of recovering a used battery and apparatus for recovering the capacity of a secondary battery comprising: (1) preparing a secondary battery with deteriorated lifespan characteristics; (2) heating the secondary battery with deteriorated lifespan characteristics while pressing the secondary battery with deteriorated lifespan characteristics to compress a positive electrode, negative electrode, or separator included in the secondary battery; and (3) charging/discharging the secondary battery with deteriorated lifespan characteristics, the secondary battery having been pressed and heated, and the secondary battery with deteriorated lifespan characteristics may be charged and discharged while being pressed and heated, thereby exhibiting an effect of recovering the capacity of the secondary battery with deteriorated lifespan characteristics.

15 Claims, 3 Drawing Sheets

METHOD OF RECOVERING CAPACITY OF A USED BATTERY AND A SECONDARY BATTERY CAPACITY RECOVERY APPARATUS

TECHNICAL FIELD

Cross-Reference to Related Application

This application claims priority to and the benefit of Korean Patent Application No. 10-2018-0021893, filed on Feb. 23, 2018, the disclosure of which is incorporated herein by reference in its entirety.

TECHNICAL FIELD

The present invention relates to a secondary battery capacity recovery method and apparatus, and more particularly, to a method of recovering the capacity of a secondary battery with deteriorated lifespan characteristics and a secondary battery capacity recovery apparatus for recovering the capacity of a secondary battery with deteriorated lifespan characteristics.

BACKGROUND ART

In line with an increase in technology development of and demand for mobile devices, demand for secondary batteries as energy sources is rapidly increasing. Among these secondary batteries, lithium secondary batteries which have high energy density and operating voltage, a long cycle lifespan, and a low self-discharge rate are commercially available and widely used.

A lithium secondary battery may lose functions thereof due to abnormal use such as overdischarging, overcharging, or the like, but even when normally used, the ability of the lithium secondary battery to store electrical energy (hereinafter referred to as "capacity") is gradually reduced according to the number of charging and discharging cycles, resulting in deteriorated lifespan characteristics. Secondary batteries are used until they lose the minimum function, and degraded secondary batteries that lose the minimum function are inevitably replaced.

However, the discarded secondary batteries are categorized as industrial waste, and thus considerable processing costs are incurred. In particular, when frequent replacement is required, purchasing costs may be a big burden.

Therefore, it will be very significantly useful to develop a technology capable of recovering the capacity of a secondary battery with deteriorated lifespan characteristics.

DISCLOSURE OF THE INVENTION

Technical Problem

An object of the present invention is to provide a method of recovering the capacity of a secondary battery with deteriorated lifespan characteristics.

Another object of the present invention is to provide a secondary battery capacity recovery apparatus for recovering the capacity of a secondary battery with deteriorated lifespan characteristics.

Technical Solution

According to an aspect of the present invention, there is provided a secondary battery capacity recovery method comprising (1) preparing a secondary battery with deteriorated lifespan characteristics, (2) heating the secondary battery with deteriorated lifespan characteristics while pressing the secondary battery with deteriorated lifespan characteristics to compress a positive electrode, negative electrode, or separator included in the secondary battery, and (3) charging/discharging the deteriorated secondary battery having been pressed and heated.

According to another aspect of the present invention, there is provided a secondary battery capacity recovery apparatus for recovering a capacity of a secondary battery with deteriorated lifespan characteristics, the secondary battery capacity recover apparatus including a clamping unit configured to fix the secondary battery with deteriorated lifespan characteristics to perform pressing and heating, and a charge/discharge unit configured to charge/discharge the secondary battery with deteriorated lifespan characteristics, wherein, while pressing and heating the secondary battery with deteriorated lifespan characteristics after being fixed to the clamping unit, the secondary battery with deteriorated lifespan characteristics is charged and discharged using the charge/discharge unit.

Advantageous Effects

A secondary battery capacity recovery method and apparatus according to the present invention, enable charging and discharging to be performed while a deteriorated secondary battery is pressed and heated, thereby exhibiting an effect of recovering the capacity of the deteriorated secondary battery.

MODE FOR CARRYING OUT THE INVENTION

Figure 1:
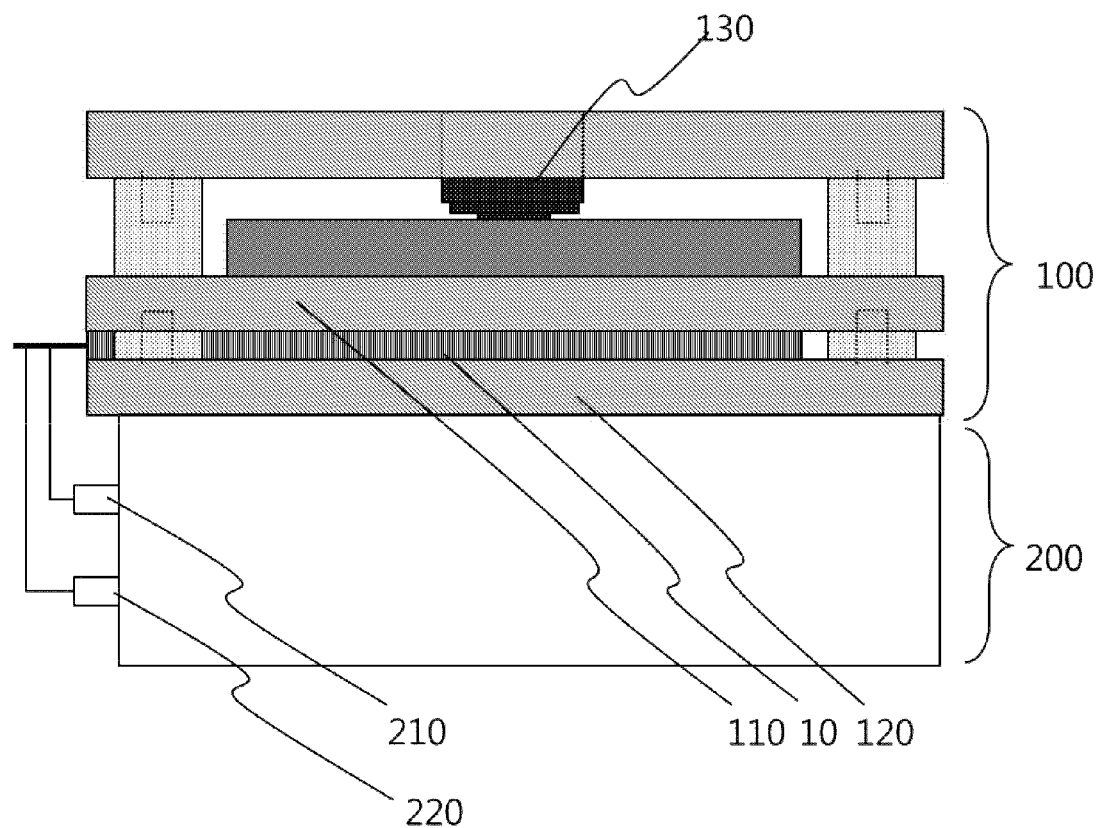
FIG. 1 is a side view of a secondary battery capacity recovery apparatus according to an embodiment of the present invention.

Hereinafter, the present invention will be described in more detail to aid in understanding of the present invention.

The terms or words used in the present specification and claims should not be construed as being limited to ordinary or dictionary meanings and should be construed as meanings and concepts consistent with the spirit of the present invention based on a principle that an inventor can appropriately define concepts of terms to explain the invention of the inventor in the best way.

The present invention provides a secondary battery capacity recovery method capable of recovering the capacity of a secondary battery with deteriorated lifespan characteristics.

The secondary battery capacity recovery method of the present invention comprises: (1) preparing a secondary battery with deteriorated lifespan characteristics; (2) heating the secondary battery with deteriorated lifespan characteristics while pressing the secondary battery with deteriorated lifespan characteristics to compress a positive electrode, negative electrode, or separator included in the secondary battery; and (3) charging/discharging the secondary battery with deteriorated lifespan characteristics, the secondary battery having been pressed and heated.

In process (1), a secondary battery with reduced capacity due to deteriorated lifespan characteristics is prepared.

The secondary battery with reduced capacity due to deteriorated lifespan characteristics refers to a secondary battery with the ability to store electrical energy, i.e., capacity which is gradually reduced according to the number of cycles of charging and discharging, and for example, refers to a secondary battery with a capacity of 90% or less, particularly 85% or less, and more particularly 5% to 80%, with respect to the initial capacity.

In process (2), heating may be performed while pressing the secondary battery with deteriorated lifespan characteristics to compress a positive electrode, negative electrode, or separator included in the secondary battery.

Through the pressing process, the positive electrode, negative electrode, or separator included in the secondary battery with deteriorated lifespan characteristics may be compressed.

As the number of cycles of a secondary battery increases, an active material undergoes repeated volumetric expansion and contraction due to continuous charging and discharging, thus causing an electrical disconnection between active materials or causing an electrical disconnection due to the destruction of active material particles themselves, resulting in reduced capacity and deteriorated lifespan characteristics. In addition, a film structure on a surface of a negative electrode active material, which is formed during an initial activation process, is destroyed and an electrode structure matrix collapses. As such, when a positive electrode, a negative electrode, and a separator which are included in the secondary battery with deteriorated lifespan characteristics are compressed by pressing the secondary battery with deteriorated lifespan characteristics, active material layers included in the positive and negative electrodes of the secondary battery with deteriorated lifespan characteristics are also compressed, and components constituting the active material layers, e.g., an active material, a conductive material, and a binder, come into contact with each other by compression. Thus, the contact between disconnected active materials or between an active material and a positive electrode current collector and/or a negative electrode current collector while the number of cycles of the secondary battery increases due to repeated cycles may be recovered.

In addition, the fluidity of the binder is increased by the heating process, and thus compression may be more efficiently performed. In addition, a part of destroyed film components which corresponds to an organic component is dissolved again in an electrolytic solution to thereby cause further formation of a stable film on a negative electrode active material layer. Moreover, through the heating process, fluidity may be imparted to a gas capable of being present between the positive electrode and the separator and between the negative electrode and the separator, i.e., a gas capable of being generated and accumulated as the number of cycles of the secondary battery increases. When the gas has fluidity by the heating process, the gas may be released outside from a space between the positive electrode and the separator and a space between the negative electrode and the separator, by the pressing. The gas released by the pressing may move to an outer portion of an electrode assembly included in the secondary battery.

The pressing may be performed at a normal position or a static pressure, more preferably a static pressure. The pressing at a static pressure means that a pressure is measured in real time according to swelling of the battery and the pressure is kept constant while changing the position of a pressing member.

A pressure during the pressing may range from 100 g/cm$^2$ to 100 kg/cm$^2$, particularly 500 g/cm$^2$ to 5 kg/cm$^2$, and more particularly 1 kg/cm$^2$ to 3 kg/cm$^2$. When the pressing is performed in the above-described pressure range, an electrode assembly included in the secondary battery with deteriorated lifespan characteristics may be effectively compressed, and thus a positive electrode, a negative electrode, and a separator are compressed and active material layers included in the positive and negative electrodes are compressed, and accordingly, electrical contact between an active material, a conductive material, and a binder constituting the active material layers may be effectively recovered and the positive electrode, the negative electrode, and the separator may not be deformed.

The heating process may be performed at a temperature ranging from 25° C. to 80° C., particularly 30° C. to 70° C., and more particularly 45° C. to 60° C. When the heating process is performed within the above temperature ranges, an organic coating layer separated from an active material layer may be appropriately reduced with an electrolytic solution, and appropriate fluidity may be imparted to a binder included in a negative electrode active material layer, thus enabling an active material, a conductive material, and a binder which are included in the active material layer to be appropriately moved by the pressing, and accordingly, contact between active materials and/or contact between an active material and a current collector may be enhanced.

In process (3), the secondary battery with deteriorated lifespan characteristics which has been pressed and heated may be charged/discharged, and the charge/discharge rate may be 0.5 C or less, particularly 0.1 C to 0.5 C, and more particularly 0.1 C to 0.2 C. When the charge/discharge rate is 0.5 C or less, uniform charging and discharging in a thickness direction (a c-axis direction) of the negative electrode may be performed under a minimized polarization condition, and accordingly, sufficient charging may occur even at a portion of a negative electrode active material in which the connection between particles is considerably lost so that the portion is re-connected with an ambient conductive network through film regeneration due to pressing and high temperature after expansion.

The charging/discharging of the secondary battery with deteriorated lifespan characteristics may be performed one to ten times, particularly five to eight times. When the secondary battery with deteriorated lifespan characteristics is charged/discharged within the above range of the number of cycles while being pressed and heated after fixation, the electrical connection of the secondary battery with deteriorated lifespan characteristics may be recovered.

The charging and discharging may be performed by a conventional charge and discharge unit used for charging and discharging of the secondary battery, and a charging method or type is not limited as long as it is a general secondary battery charging/discharging method.

The secondary battery capacity recovery method according to an embodiment of the present invention may be performed using a secondary battery capacity recovery apparatus for recovering the capacity of a secondary battery with deteriorated lifespan characteristics.

Therefore, the present invention provides a secondary battery capacity recovery apparatus for recovering the capacity of a secondary battery with deteriorated lifespan characteristics.

The secondary battery capacity recovery apparatus includes a clamping unit configured to fix the secondary battery with deteriorated lifespan characteristics to perform pressing and heating, and a charge/discharge unit configured to charge/discharge the secondary battery with deteriorated lifespan characteristics, wherein the deteriorated secondary battery is fixed to the clamping unit, and then while being pressed and heated, the deteriorated secondary battery is charged/discharged through the charge/discharge unit.

The process for recovering the capacity of the secondary battery through the secondary battery capacity recovery apparatus comprises fixing a secondary battery with reduced capacity due to deteriorated lifespan characteristics to perform pressing and heating and charging/discharging the pressed and heated secondary battery.

The pressing and heating may be performed using the clamping unit, and the clamping unit may comprise: a pressing member configured to compress an outer surface of the secondary battery with deteriorated lifespan characteristics by pressing; and a heating member configured to apply heat to the secondary battery with deteriorated lifespan characteristics.

The secondary battery with deteriorated lifespan characteristics comprises an electrode assembly comprising a positive electrode, a negative electrode, and a separator disposed therebetween, and the pressing member may include a pair or more of pressing surfaces that are parallel to the positive electrode, negative electrode, or separator included in the secondary battery with deteriorated lifespan characteristics and face each other with the secondary battery present therebetween. The expression "pressing surfaces that are parallel to the positive electrode, negative electrode, or separator included in the secondary battery" means that the pressing surfaces are parallel to a surface of the positive electrode, the negative electrode, or the separator. Thus, when pressing outer surfaces of the secondary battery by the pressing surfaces, outer surfaces of the secondary battery which are parallel to the surface of the positive electrode, the negative electrode, or the separator may be pressed. For example, when the secondary battery comprises a rectangular or pouch-type case, wide surfaces of the rectangular or pouch-type case may be pressed.

The pressing surfaces included in the pressing member may include an upper press and a lower press that face each other with the secondary battery present therebetween, and while the upper press moves downward toward the lower press or the upper and lower presses move toward each other, the upper and lower presses may apply a pressure to the secondary battery by pressing. A pair or more of upper and lower presses may be included.

The upper press, or the upper press and the lower press may be connected to a cylinder configured to move the upper press, or the upper press and the lower press, and the movement distance and/or pressure of the cylinder may be adjusted by a pressure adjustment portion connected to the cylinder. For example, the movement distance of the cylinder may be adjusted by the pressure adjustment portion, and through this adjustment, the movement distance of the upper press, or the upper press and the lower press may be adjusted and the intensity of a pressure applied to the secondary battery positioned therebetween may be adjusted.

The heating member may be connected to the upper press, the lower press, or the upper press and the lower press, and a heating unit included in the heating member may heat any one or more of the upper press and the lower press. In addition, a temperature sensor may be included in a portion of the secondary battery contacting the upper press and the lower press, and thus the heating temperature may be appropriately adjusted by measuring the temperature of the secondary battery.

The charge/discharge unit is not particularly limited as long as it is a charge/discharge unit commonly used in charging/discharging of a secondary battery, and the charging method or type is also not limited as long as it is a general secondary battery charging/discharging method.

When the secondary battery with deteriorated lifespan characteristics is charged/discharged using the charge/discharge unit while pressing and heating the secondary battery with deteriorated lifespan characteristics after being fixed by the clamping unit, the electrical connection of the secondary battery with deteriorated lifespan characteristics may be recovered.

Hereinafter, an apparatus for recovering the capacity of a secondary battery of the present invention will be described in further detail with reference to the accompanying drawings, but the corresponding drawings are provided for illustrative purposes and are not intended to limit the scope of the present invention. In the drawings of the present invention, the size of each component may be exaggerated for illustrative purposes and may differ from the size actually applied. To clearly explain the present invention, parts not related to the description are omitted, and like parts are denoted by like reference numerals throughout the specification.

FIG. 1 is a side view of a secondary battery capacity recovery apparatus according to an embodiment of the present invention.

Referring to FIG. 1, the secondary battery capacity recovery apparatus according to an embodiment of the present invention comprises a clamping unit 100 configured to fix a deteriorated secondary battery 10 to perform pressing and heating and a charge/discharge unit 200 configured to charge/discharge the deteriorated secondary battery 10. The clamping unit 100 includes a pressing member including upper and lower presses 110 and 120 configured to press and compress an outer circumferential surface of the deteriorated secondary battery 10. A heating member (not shown) configured to heat plates constituting the upper press 110 and the lower press 120 may be connected to the upper press 110 and the lower press 120, and thus may heat surface portions of the secondary battery 10 contacting the upper press 110 and the lower press 120 at an appropriate heating temperature. In addition, a temperature sensor (not shown) may be positioned at surfaces of the secondary battery 10 contacting the upper press 110 and the lower press 120. In the pressing member, the upper press 110 and the lower press 120 face each other with the deteriorated secondary battery 10 present therebetween, the upper press 110 is connected to a cylinder 130 configured to move the upper or lower press 110 or 120, and the upper press 110 presses the outer circumferential surface of the deteriorated secondary battery while moving downward toward the lower press 120. Although not shown, if needed, the lower press 120 may also be configured like the upper press 110 such that the lower press 120 is connected to a separate cylinder to press the outer circumferential surface of the deteriorated secondary battery 10 while moving upward toward the upper press 110. In addition, the charge/discharge unit 200 includes a positive (+) terminal 210 and a negative (−) terminal 220 that are respectively connected to electrode leads (denoted by 11 and 12 in FIG. 2) of the deteriorated secondary battery 10 and performs charging and discharging.

Figure 2:
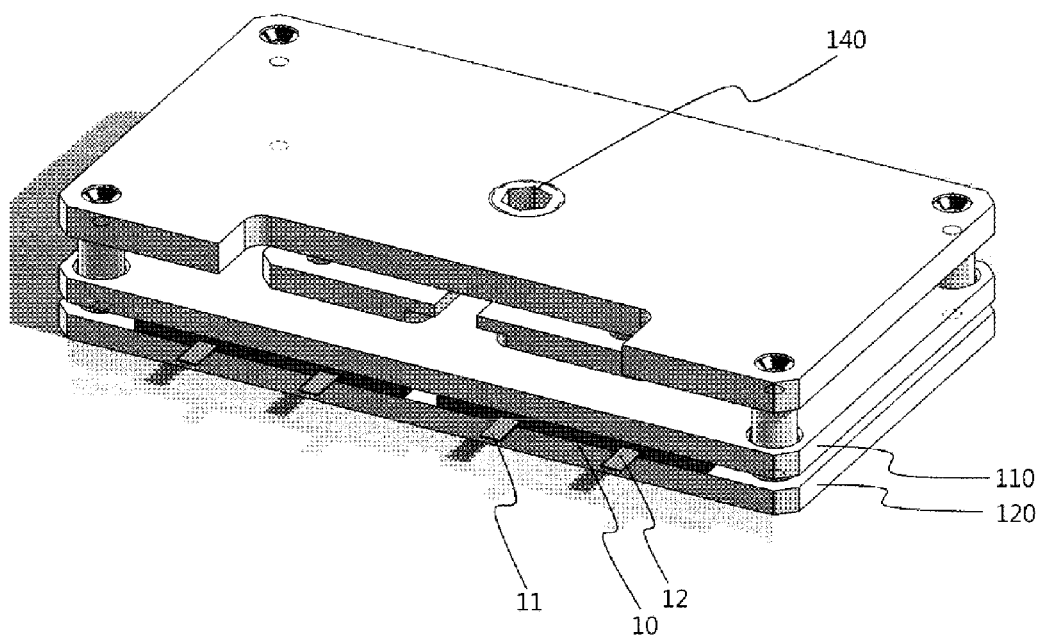
FIG. 2 is a schematic view of a clamping device included in a secondary battery capacity recovery apparatus according to an embodiment of the present invention.

FIG. 2 is a schematic view of the clamping unit 100 included in the secondary battery capacity recovery apparatus according to an embodiment of the present invention.

Referring to FIG. 2, the clamping unit 100 may be provided, at an upper surface thereof, with a pressure adjustment portion 140 configured to adjust the movement distance and/or pressure of a cylinder (130 in FIG. 1) and connected to the cylinder.

A deteriorated secondary battery to which the secondary battery capacity recovery method and apparatus according to the present invention are applicable is not particularly limited as long as it is a rechargeable secondary battery with reduced capacity according to an increase in the number of cycles. In particular, in the case of a lithium secondary battery comprising a silicon-based negative electrode active material as a negative electrode active material, contact between negative electrode active materials included in a negative electrode active material layer of a negative electrode and contact between a negative electrode active material and a negative electrode current collector are more significantly damaged due to a large volumetric change of the silicon-based negative electrode active material during charging and discharging as the number of cycles of the secondary battery increases, and thus an effect according to the secondary battery capacity recovery method of the present invention may be further remarkably exhibited.

For example, in an embodiment of the secondary battery capacity recovery apparatus of the present invention or a secondary battery reuse method of the present invention, the secondary battery with deteriorated lifespan characteristics may comprise a negative electrode comprising a silicon-based negative electrode active material. In processes of charging/discharging the deteriorated secondary battery having gone through pressing and heating, the electrical connection between silicon-based negative electrode active materials of the deteriorated secondary battery may be recovered. The secondary battery comprising a negative electrode comprising the silicon-based negative electrode active material may be a lithium secondary battery.

The silicon-based negative electrode active material may comprise one or more selected from the group consisting of Si, silicon oxide particles ($SiO_x$, $0<x\leq2$), Si-metal alloys, and alloys of Si and silicon oxide particles ($SiO_x$, $0<x\leq2$).

The outer shape of the lithium secondary battery is not particularly limited, but may be a cylindrical shape, a rectangular shape, a pouch shape, a coin shape, or the like which uses a can, and particularly, may be a rectangular shape, a pouch shape, or a coin shape.

The lithium secondary battery may be a battery cell used as a power source of a small device or a unit battery used in a middle- or large-sized battery module comprising a plurality of battery cells.

BEST MODE FOR CARRYING OUT THE INVENTION

Examples

Hereinafter, the present invention will be described in further detail with reference to examples and an experimental example, but the examples and the experimental example are not intended to limit the present invention. The examples according to the present invention may be modified into various other forms, and the scope of the present invention should not be construed as being limited to the embodiments described below. The examples of the present invention are provided to more fully explain the present invention to those of ordinary skill in the art.

Preparation Example

A negative electrode slurry consisting of 70 wt % of silicon, 20 wt % of a graphite-based conductive material, and 10 wt % of a polyacrylic acid (PAA) binder was coated on copper foil having a thickness of 10 μm, and then dried at 60° C., roll-pressed at 1.5 g/cc, and dried in a vacuum at 130° C., thereby completing the fabrication of a negative electrode. Separately, a positive electrode slurry consisting of 95 wt % of lithium nickel cobalt manganese oxide (NCM622), 2 wt % of carbon black, and 3 wt % of polyvinylidene fluoride (PVdF) was coated on aluminum foil having a thickness of 15 μm, and then dried at 60° C., roll-pressed at 3.5 g/cc, and dried in a vacuum at 130° C., thereby completing the fabrication of a positive electrode. Several sheets of bi-cells manufactured by laminating the fabricated positive electrode and negative electrode together with a separator having a thickness of 12 μm were stacked to thereby manufacture pouch-type batteries (A to J). An electrolytic solution was injected into each of the manufactured pouch-type batteries A to J, and then each battery was charged and discharged in the range of 4.2 V to 3.0 V through a formation operation after going through a wetting time, and then a 0.5 C/0.5 C cycle was repeated up to 80 cycles.

Example 1

The pouch-type battery A manufactured according to the Preparation Example was fastened with a clamping unit of a secondary battery capacity recovery apparatus as illustrated in FIGS. 1 and 2, and then the pressure was set at a static pressure of 1 kg/cm² and the heating temperature was set at 60° C., to press and heat an outer surface of the pouch-type battery. The pressing and heating were maintained for about 30 minutes to stabilize the temperature, and the cycle of charging and discharging proceeded five times at a rate of 0.1C of the rated capacity of the battery. Subsequently, the pouch-type battery was detached from the clamping unit and a lifespan characteristic evaluation was continued at room temperature.

Example 2

A lifespan characteristic evaluation was carried out in the same manner as in Example 1, except that the pouch-type battery B manufactured according to the Preparation Example was fastened with a clamping unit, and the pressure was set at a static pressure of 3 kg/cm².

Example 3

A lifespan characteristic evaluation was carried out in the same manner as in Example 1, except that the pouch-type battery C manufactured according to the Preparation Example was fastened with a clamping unit, and the pressure was set at a static pressure of 100 kg/cm².

Example 4

A lifespan characteristic evaluation was carried out in the same manner as in Example 1, except that the pouch-type battery D manufactured according to the Preparation Example was fastened with a clamping unit, and the pressure was set at a static pressure of 30 kg/cm².

Example 5

A lifespan characteristic evaluation was carried out in the same manner as in Example 1, except that the pouch-type battery E manufactured according to the Preparation Example was fastened with a clamping unit, and the heating temperature was set at 30° C.

Example 6

A lifespan characteristic evaluation was carried out in the same manner as in Example 1, except that the pouch-type battery F manufactured according to the Preparation Example was fastened with a clamping unit, and the heating temperature was set at 80° C.

Example 7

A lifespan characteristic evaluation was carried out in the same manner as in Example 1, except that the pouch-type battery G manufactured according to the Preparation Example was fastened with a clamping unit, and the cycle of charging and discharging was performed five times at 1.0C.

Comparative Example 1

A lifespan characteristic evaluation was carried out in the same manner as in Example 1, except that the cycle of charging and discharging was performed five times while the pouch-type battery H manufactured according to the Preparation Example was only pressed without heating.

Comparative Example 2

A lifespan characteristic evaluation was carried out in the same manner as in Example 1, except that the cycle of charging and discharging was performed five times while the pouch-type battery I manufactured according to the Preparation Example was only heated without pressing.

Comparative Example 3

A lifespan evaluation was carried out using the pouch-type battery J manufactured according to the Preparation Example without the aid of a secondary battery capacity recovery apparatus.

Experimental Example

Figure 3:
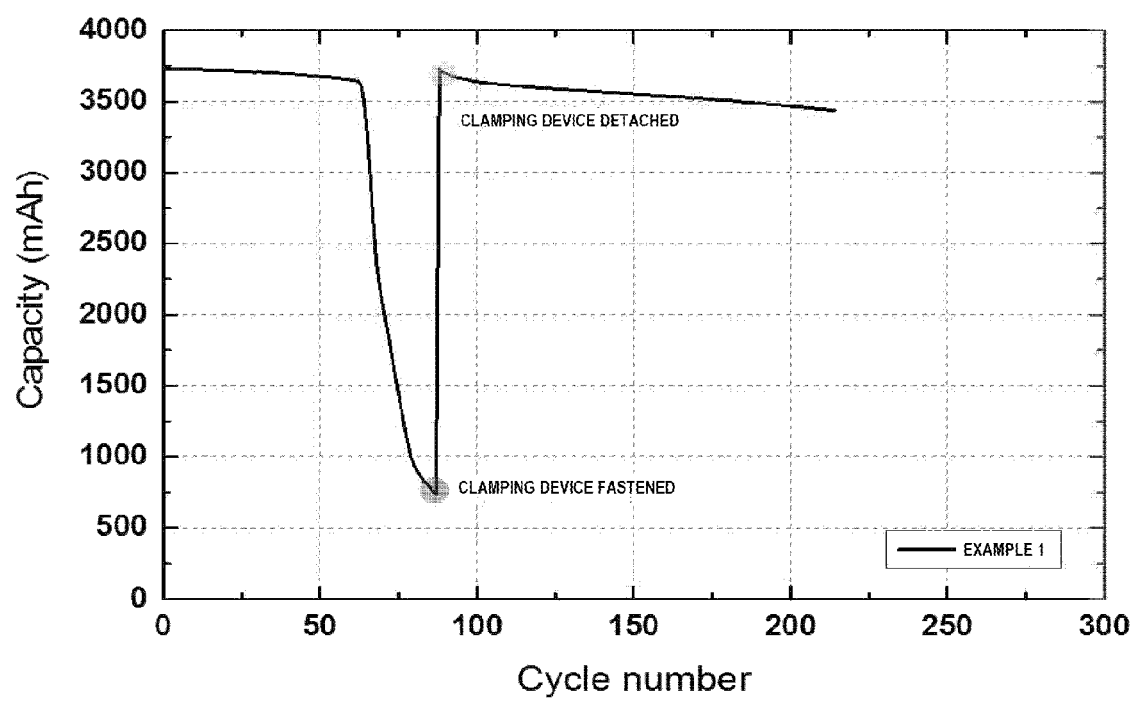
FIG. 3 is a graph showing changes in capacity according to the number of cycles of a secondary battery according to Example 1.

The lifespan characteristic evaluation results of the pouch-type batteries of the examples and the comparative examples are shown in Table 1 below, and capacity retention according to the number of cycles of the battery of Example 1 is illustrated in FIG. 3.

TABLE 1

| | Type of battery | $1^{st}$ cycle | $80^{th}$ cycle | $81^{th}$ cycle (First cycle after fastened with secondary battery capacity recovery apparatus) | $86^{th}$ cycle <$82^{th}$ cycle on the graph> (First cycle after detached from secondary battery capacity recovery apparatus) | $200^{th}$ cycle |
|---|---|---|---|---|---|---|
| Example 1 | A | 3740 mAh | 750 mAh | 3710 mAh | 3730 mAh | 3685 mAh |
| Example 2 | B | 3745 mAh | 730 mAh | 3715 mAh | 3735 mAh | 3690 mAh |
| Example 3 | C | 3755 mAh | 725 mAh | 3145 mAh | 2885 mAh | 2730 mAh |
| Example 4 | D | 3750 mAh | 720 mAh | 3620 mAh | 3580 mAh | 3225 mAh |
| Example 5 | E | 3745 mAh | 730 mAh | 3705 mAh | 3435 mAh | 3185 mAh |
| Example 6 | F | 3755 mAh | 745 mAh | 3830 mAh | 3420 mAh | 3395 mAh |
| Example 7 | G | 3745 mAh | 755 mAh | 3550 mAh | 3600 mAh | 385 mAh |
| Comparative Example 1 | H | 3735 mAh | 715 mAh | 2875 mAh | 2285 mAh | 1535 mAh |
| Comparative Example 2 | I | 3745 mAh | 735 mAh | 455 mAh | 435 mAh | 315 mAh |
| Comparative Example 3 | J | 3760 mAh | 720 mAh | 380 mAh | 350 mAh | 150 mAh |

As can be seen from Table 1, when the heating and pressing were performed as in the examples, it was found that the capacity was recovered immediately after being fastened with the clamping unit of the secondary battery capacity recovery apparatus, and even after the battery was detached from the apparatus after the 86th cycle, lifespan characteristics thereof were stably maintained. In contrast, the case of Comparative Example 1 exhibited a relatively insufficient degree of capacity recovery due to only pressing without heating, and the case of Comparative Example 2 exhibited an insignificant degree of capacity recovery due to only heating without pressing. Meanwhile, it was confirmed that the case of Example 7, in which the charge/discharge rate was increased to 1.0 C, exhibited immediately recovered capacity after being fastened with a clamping unit of a secondary battery capacity recovery apparatus as in Examples 1 to 6, and stably maintained lifespan characteristics even after being detached from the apparatus after the 86th cycle. However, it was confirmed that, since capacity after the 200th cycle was reduced, the charge/discharge rate of the deteriorated secondary battery was to be within a certain value to exhibit a more significant effect.

| [Description of Reference Numerals] | |
|---|---|
| 10: Secondary battery | 11, 12: Electrode leads |
| 100: Clamping unit | 110: Upper press |
| 120: Lower press | 130: Cylinder |
| 140: Pressure adjustment portion | 200: Charge/discharge unit |
| 210: +terminal | 220: −terminal |

The invention claimed is:

1. A method of recovering capacity of a secondary battery with a capacity (mAh) of 5% to 80% with respect to an original capacity of the secondary battery comprising:

heating the secondary battery while pressing the secondary battery to compress a positive electrode, negative electrode, or separator included in the secondary battery;

charging and discharging the secondary battery at a rate of 0.1 C or more and 0.5 C or less while heating and pressing the secondary battery; and producing the secondary battery having an increased capacity than the secondary battery with the capacity (mAh) of 90% or less, wherein the secondary battery comprises a negative electrode comprising a silicon-based negative electrode active material, and in the charging and discharging, an electrical connection between elements of the silicon-based negative electrode active material is recovered.

2. The method of claim 1, wherein the pressing is performed at a pressure of 100 g/cm² to 100 kg/cm².

3. The method of claim 1, wherein the heating is performed at a temperature ranging from 25° C. to 80° C.

4. The method of claim 1, wherein the charging and discharging is performed one to ten times.

5. The method of claim 1, wherein in the preparing a secondary battery in the used state comprising conducting more than one cycle of charge and discharge of the secondary battery with a capacity (mAh) of 85% or less than the original capacity of the secondary battery.

6. The method of claim 1, wherein in the preparing a secondary battery in the used state comprising conducting more than one cycle of charge and discharge of the secondary battery with a capacity (mAh) of 5 to 80% with respect to the original capacity of the secondary battery.

7. The method of claim 1, wherein the pressing is performed at a pressure of 500 g/cm² to 5 kg/cm².

8. The method of claim 1, wherein the pressing is performed at a pressure of 1 kg/cm² to 3 kg/cm².

9. The method of claim 1, wherein the heating is performed at a temperature ranging from 45° C. to 70° C.

10. The method of claim 1, wherein the heating is performed at a temperature ranging from 45° C. to 60° C.

11. The method of claim 1, wherein the charging and discharging is performed at a charge or discharge rate of 0.1 to 0.5 C.

12. The method of claim 1, wherein the charging and discharging is performed at a charge or discharge rate of 0.1 to 0.2 C.

13. The method of claim 1, wherein the capacity (mAh) of 5% to 80% is reduced from the original capacity of the secondary battery by a number of cycles of charging and discharging of the secondary battery.

14. The method of claim 1, wherein the charging and discharging the secondary battery at a rate of 0.1 C or more and 0.5C or less while heating and pressing the secondary battery is not an activation process of the secondary battery with the original capacity.

15. The method of claim 1, wherein the method is not a method of manufacturing the secondary battery with the original capacity.

* * * * *